(12) United States Patent
Wang et al.

(10) Patent No.: US 11,582,049 B2
(45) Date of Patent: Feb. 14, 2023

(54) VIRTUAL NETWORK FUNCTION MANAGEMENT

(71) Applicant: Nokia Technologies Oy, Espoo (FI)

(72) Inventors: Zhi Wang, Shandong (CN); Yigang Cai, Naperville, IL (US)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/954,435

(22) PCT Filed: Dec. 22, 2017

(86) PCT No.: PCT/CN2017/118074
§ 371 (c)(1),
(2) Date: Jun. 16, 2020

(87) PCT Pub. No.: WO2019/119437
PCT Pub. Date: Jun. 27, 2019

(65) Prior Publication Data
US 2021/0091967 A1  Mar. 25, 2021

(51) Int. Cl.
*H04L 12/14* (2006.01)
*H04L 41/0893* (2022.01)
(Continued)

(52) U.S. Cl.
CPC ...... *H04L 12/1407* (2013.01); *H04L 41/0893* (2013.01); *H04L 43/0876* (2013.01);
(Continued)

(58) Field of Classification Search
CPC . H04W 48/14; H04W 36/0077; H04W 36/14; H04W 88/06; H04W 76/15; H04W 72/04; H04W 4/24; H04L 12/1407; H04L 41/0893; H04L 43/0876; H04L 43/16; H04L 12/14; H04L 12/1403;
(Continued)

(56) References Cited

U.S. PATENT DOCUMENTS

2015/0326448 A1* 11/2015 Chaudhary ............ G06Q 30/04
 705/40
2016/0261495 A1* 9/2016 Xia .......................... H04L 45/44
(Continued)

FOREIGN PATENT DOCUMENTS

CN  107111597 A  8/2017
CN  107113195 A  8/2017
(Continued)

*Primary Examiner* — Asghar H Bilgrami
(74) *Attorney, Agent, or Firm* — Harrington & Smith

(57) ABSTRACT

Embodiments of the present disclosure relate to methods, apparatuses and computer readable mediums for Virtual Network Function (VNF) management. In example embodiments, there is provided a method of managing a VNF. The method includes sending, from a VNF manager to a charging component, at least one request for charging information associated with at least one VNF. The VNF manager manages the at least one VNF. The charging information indicates respective rates for charging the at least one VNF under different network conditions. The method further includes, in response to receiving the charging information, managing lifecycle of the at least one VNF at least in part based on the charging information.

17 Claims, 4 Drawing Sheets

(51) Int. Cl.
*H04L 43/0876* (2022.01)
*H04L 43/16* (2022.01)
*H04M 15/00* (2006.01)
*H04W 4/24* (2018.01)
*H04L 41/0895* (2022.01)
*H04L 43/20* (2022.01)

(52) U.S. Cl.
CPC ............ *H04L 43/16* (2013.01); *H04M 15/66* (2013.01); *H04W 4/24* (2013.01)

(58) Field of Classification Search
CPC . H04L 41/0895; H04L 41/0897; H04L 43/20; H04M 15/66
See application file for complete search history.

(56) References Cited

U.S. PATENT DOCUMENTS

| | | | | |
|---|---|---|---|---|
| 2017/0104609 A1* | 4/2017 | McNamee | ............. | H04W 4/24 |
| 2017/0142591 A1* | 5/2017 | Vrzic | .................... | H04W 16/02 |
| 2017/0201922 A1* | 7/2017 | Akiyoshi | ............. | H04W 36/22 |

FOREIGN PATENT DOCUMENTS

| | | | | |
|---|---|---|---|---|
| CN | 109196828 A | 1/2019 | | |
| EP | 3461087 A1 * | 3/2019 | ............ | H04L 45/64 |
| EP | E P-3461087 A1 * | 3/2019 | ............ | H04L 45/64 |
| WO | WO 2016/060597 A1 | 4/2016 | | |
| WO | WO-2017/214932 A1 | 12/2017 | | |

* cited by examiner

VIRTUAL NETWORK FUNCTION MANAGEMENT

Cross Reference to Related Application

This patent application is a U.S. National Stage application of International Patent Application Number PCT/CN2017/118074 filed Dec. 22, 2017, which is hereby incorporated by reference in its entirety.

TECHNICAL FIELD

Embodiments of the present disclosure generally relate to the field of telecommunication, and in particular, to methods, apparatuses and computer readable mediums for managing Virtual Network Function (VNF).

BACKGROUND

Network Functions Virtualization (NFV) is a telecom led initiative that aims to utilize standard IT virtualization technology to consolidate various telecom network equipment types onto standard servers, switches and storage devices. NFV involves implementing network functions in software that can run on standard server hardware, and that can be moved to, or instantiated in, various locations in the network as required, without the need to install new proprietary equipment. VNF management is important for NFV. The key problem is how to balance performance and cost of VNFs. To pursue the best performance with as less cost as possible, many solutions have been proposed. However, conventional solutions cannot meet an increasing demand on efficient use of resources while providing NFV providers with dynamic tariff for VNF management.

SUMMARY

In general, example embodiments of the present disclosure provide methods, apparatuses and computer readable mediums for VNF management.

In a first aspect, there is provided a method of managing a VNF. The method comprises sending, from a VNF manager to a charging component, at least one request for charging information associated with at least one VNF. The VNF manager manages the at least one VNF. The charging information indicates respective rates for charging the at least one VNF under different network conditions. The method further comprises, in response to receiving the charging information, managing lifecycle of the at least one VNF at least in part based on the charging information.

In a second aspect, there is provided a method of managing a VNF. The method comprises generating charging information associated with the VNF. The charging information indicates a charge rate for charging the VNF under a network condition. The method further comprises, in response to receiving from a VNF manager a request for the charging information, sending the charging information to the VNF manager. The VNF manager manages lifecycle of the VNF at least based on the charging information.

In a third aspect, there is provided an apparatus for managing a VNF. The apparatus includes a processor and a memory. The memory is coupled to the processing unit and stores instructions thereon. The instructions, when executed by the processing unit, cause the apparatus to perform actions. The actions comprise sending, from a VNF manager to a charging component, at least one request for charging information associated with at least one VNF. The VNF manager manages the at least one VNF. The charging information indicates respective rates for charging the at least one VNF under different network conditions. The actions further comprise, in response to receiving the charging information, managing lifecycle of the at least one VNF at least in part based on the charging information.

In a fourth aspect, there is provided an apparatus for managing a VNF. The apparatus includes a processor and a memory. The memory is coupled to the processing unit and stores instructions thereon. The instructions, when executed by the processing unit, cause the apparatus to perform actions. The actions comprise generating charging information associated with the VNF. The charging information indicates a charge rate for charging the VNF under a network condition. The actions further comprise, in response to receiving from a VNF manager a request for the charging information, sending the charging information to the VNF manager. The VNF manager manages lifecycle of the VNF at least based on the charging information.

In a fifth aspect, there is provided a computer readable medium having instructions stored thereon. The instructions, when executed on at least one processor, cause the at least one processor to carry out the method according to the first aspect.

In a sixth aspect, there is provided a computer readable medium having instructions stored thereon. The instructions, when executed on at least one processor, cause the at least one processor to carry out the method according to the second aspect.

In a seventh aspect, there is provided a computer program product that is tangibly stored on a computer readable storage medium. The computer program product includes instructions which, when executed on at least one processor, cause the at least one processor to carry out the method according to the first aspect.

In an eighth aspect, there is provided a computer program product that is tangibly stored on a computer readable storage medium. The computer program product includes instructions which, when executed on at least one processor, cause the at least one processor to carry out the method according to the second aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
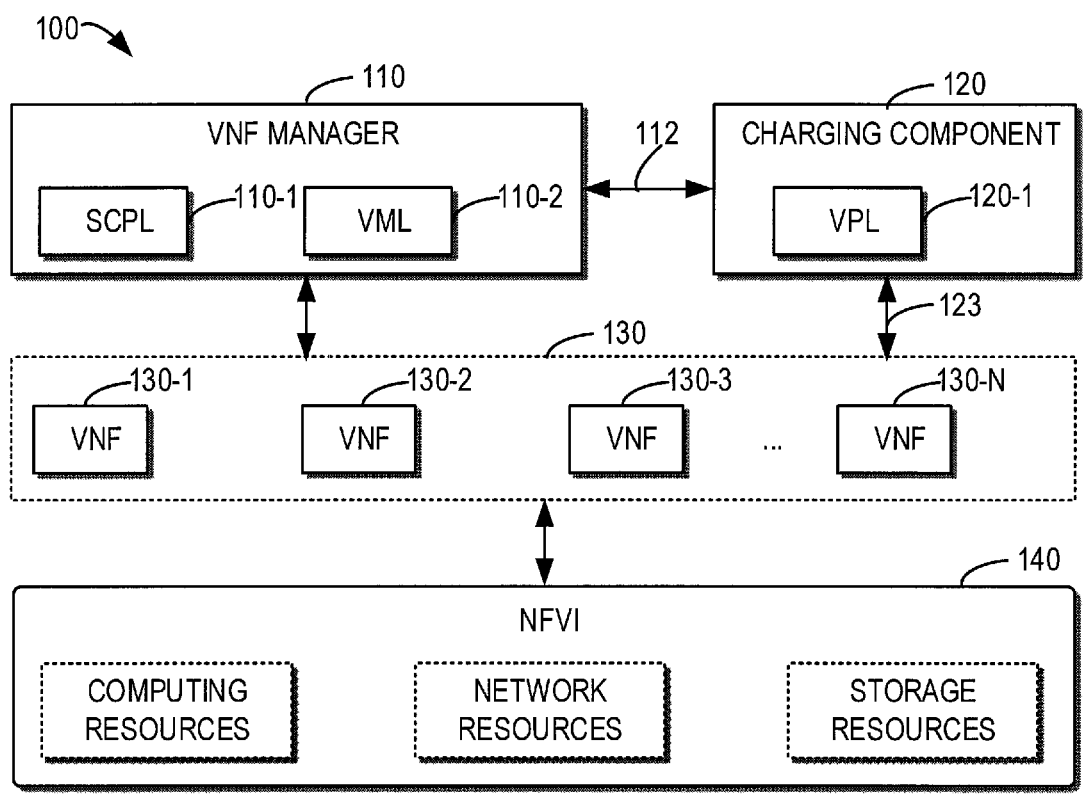
FIG. 1 shows a block diagram of an example network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As described above, to pursue the best performance with as less cost as possible, many solutions have been proposed. For example, some solution proposes to control a flow NFV architecture, thereby ensuring the normal operation of critical business under the impact of sudden large flow at NFV architecture to improve system reliability. Some solution provides VNF capability expansion with best-matched virtual machine infrastructure resources to reduce waste of resources during capacity expansion of a VNF. Some solution provides a scaling out method in a NFV system to avoid the negative impact caused by the scaling of one VNF in the service flow path. However, these conventional solutions fail to consider the accounting/charging information related to the VNF. Without considering the accounting/charging information, the operators cannot provide dynamic VNF management based on context-dependent tariff and ROI. Therefore, these solutions cannot meet an increasing demand on efficient use of resources while providing NFV providers with dynamic tariff for VNF management.

Moreover, smart charging plays an increasingly vital role in the future of mobile, broadband internet, data content and infrastructure resources management. It provides dynamic context-based mechanism used by a service or resource provider to set the price charged to a user in exchange for handling a service/resource request. The context from which the price is determined may incorporate various aspects, such as: the request time, the request type, the application originating the request, the current service/resource usage pattern, the network status, the type of the user, or any other potentially relevant aspect of the service/resource request.

Therefore, how to consider smart charging information in VNF management (such as, VNF instantiation, scaling, termination, and the like) to pursue more revenues with less expensive resources and provide dynamic VNF management based on context-dependent tariff and ROI is an unavoidable technical question in the near future.

In this event, a solution for VNF management is proposed. This solution proposes a new smart charging policy for NFV and enables dynamic VNF management based on smart charging information.

Principle and embodiments of the present disclosure will be described in detail below with reference to FIG. 1, which shows an example network 100 in which embodiments of the present disclosure can be implemented. For example, the network 100 can be a telecommunication network. As shown in FIG. 1, in general, the network 100 includes a VNF manager 110, a charging component 120, NFV infrastructure (NFVI) 140 and VNFs 130-1, 130-2 . . . 130-N (collectively referred to as VNFs 130 or individually referred to as VNF 130). It is to be understood that the structure and functionalities of the network 100 are described only for purpose of illustration without suggesting any limitation to the scope of the present disclosure. Embodiments of the present disclosure may also be applied to a different network with a different structure and/or different functionalities.

In some embodiments, a VNF 130 can be software implementation of a network function which is capable of running over the NFVI 140. Examples of the network function may include, but not limited to, 3GPP Evolved Packet Core (EPC) network elements, such as Mobility Management Entity (MME), Serving Gateway (SGW), Packet Data Network Gateway (PGW) and so on; elements in a home network, such as Residential Gateway (RGW); and conventional network functions, such as Dynamic Host Configuration Protocol (DHCP) servers, firewalls and so on. The NFVI 140 may include various physical and/or virtual resources, such as computing resources, network resources and storage resources. The NFVI 140 can support the execution of the VNF 130.

In some embodiments, the charging component 120 may implement offline and/or online charging mechanisms for the VNF 130 via a charging interface 123. The charging interface 123 can be an online and/or offline charging interface. In order to support these charging mechanisms, resource usage on the VNF 130 can be monitored to detect a relevant chargeable event. Typical examples of resource usage may include, but not limited to, a voice call of certain duration, the transport of a certain volume of data and the like. Information related to the chargeable event may be collected, formatted, transferred and evaluated in order to make it possible to determine usage for which the user of the VNF 130 may be billed or the user's account balance may be debited.

In some embodiments, as shown in FIG. 1, the charging component 120 may include VNF Policy Logic (VPL) 120-1. As used herein, the logic may be any module(s) implemented by hardware, software, firmware or any combination thereof. The VPL 120-1 can provide charging information associated with the VNF 130 to the VNF manager 110 via a communication interface 112. For example, the charging information may include, but not limited to, a smart charging plan, VNF management opinions from the view of charging and so on. The VPL 120-1 may generate the charging information based on inputs from Policy and Charging Rules Function (PCRF, not shown in FIG. 1), local provisions, different applications and/or other network elements.

In some embodiments, the smart charging plan may include a set of charging rules. Each of the charging rules may indicate a charge rate for charging the VNF 130 under a specific network condition. Examples of a network condition may include, but not limited to, time, availability of virtual and/or physical resources, the user of the VNF 130, the resource usage on the VNF 130, the application type of the VNF 130, the account balance of the user of the VNF 130, and so on. For example, the smart charging plan may indicate that a VIP user will get a lower charge rate than other users. As another example, the smart charging plan may indicate that a lower charge rate can be applied when there are enough virtual and/or physical resources in the network 100, while a higher charge rate can be applied when the virtual and/or physical resources are in shortage. As a further example, the smart charging plan may indicate that the charge rate will be increased or decreased in response to a change in the resource usage on the VNF 130. Alternatively, or in addition, the smart charging plan may indicate that the charge rate for charging the VNF 130 can be changed based on different network conditions.

In some embodiments, the charging information may provide VNF management opinions from the view of charging. For example, the charging information may indicate different priorities assigned to different VNFs 130 by the VPL 120-1. The VPL 120-1 may assign a respective priority to a VNF 130 based on Return on Investment (ROI) of the VNF 130. The ROI of the VNF 130 may be calculated as revenue generated by the VNF 130 divided by the cost (which depends on the current charge rate) of the VNF 130. For example, a VNF 130 with higher ROI may have a higher priority than others. In some embodiments, when a plurality of VNFs require a same limited resource, the resource will allocated to one of the plurality of VNFs with a higher priority.

In some embodiments, the VPL 120-1 may further include an event distributer (now shown in FIG. 1). For example, the event distributer may be responsible for reporting a change on the charge rate for charging the VNF 130 due to a different network condition. In one embodiment, the event distributer may report respective changes on charge rates for all of the VNFs 130 actively. In another embodiment, the event distributer may report a change on the charge rate for a specific VNF in response to a request from the VNF manager 110.

In some embodiments, the VNF manager 110 may be responsible for managing lifecycle of the VNF 130. The management of the VNF 130 performed by the VNF manager 110 may include, but not limited to, instantiation, update, query, scaling and/or termination of the VNF 130. In one embodiment, a plurality of VNF managers can be deployed, each of which manages lifecycle of a respective VNF. In some other embodiments, as shown in FIG. 1, one VNF manager 110 can serve a plurality of VNFs 130. In some embodiments, as shown in FIG. 1, the VNF manager 110 may implement a Smart Charging Controlled VNF logic (SCCVL) which provides the following two functional modules: a Smart Charging Policy Logic (SCPL) 110-1 and a VNF Management Logic (VML) 110-2. As used herein, the logic may be any module(s) implemented by hardware, software, firmware or any combination thereof. In some embodiments, the SCPL 110-1 may be responsible for generating a VNF management policy base on the charging information received from the VPL 120-1 in the charging component 120 and causing the VML 110-2 to perform the VNF management policy.

In some embodiments, the SCPL 110-1 may send at least one request for the charging information associated with the VNFs 130 to the charging component 120. In some embodiments, a respective request for the charging information associated with each of the VNFs 130 may be sent to the charging component 120. Alternatively, only one request for the charging information associated with all of the VNFs 130 can be sent to the charging component 120. For example, in response to smart charging based VNF management being enabled, the at least one request may be sent to the charging component 120. As another example, in response to a request to instantiate a VNF 130, a request for the charging information associated with the VNF 130 may be sent to the charging component 120. In some embodiments, the charging information obtained from the charging component 120 can be saved at a local database by the SCPL 110-1 for later use. If the charging information indicates that the charge rate for charging the VNF 130 can be changed based on a different network condition, the SCPL 110-1 may send a further request for a notification on a change in the charge rate to the charging component 120.

In one embodiment, the SCPL 110-1 may generate the VNF management policy based on the charging information received from the charging component 120. For example, the VNF management policy may be exactly the same as the charging information received from the charging component 120. In another embodiment, the SCPL 110-1 may generate the VNF management policy based on the charging information and some local provisions of the SCPL 110-1.

In some embodiments, the VML 110-2 may be responsible for performing the VNF management policy generated by the SCPL 110-1. For example, the VML 110-2 may determine and perform, based on the VNF management policy, an appropriate operation to be performed on the VNF 130. The operation on the VNF 130 may include, but not limited to, instantiation, update, query, scaling and/or termination of the VNF 130. In some embodiments, if the SCPL 110-1 receives from the charging component 120 a notification indicating a different charge rate for charging the VNF 130 (for example, due to a change in the network condition), the SCPL 110-1 may cause the VML 110-2 to perform a corresponding operation. For example, if the different charge rate is greater than a first threshold preconfigured by the user of the VNF 130, the VML 110-2 may scale in the VNF 130 by reducing resources allocated to the VNF 130 to satisfy requirements of the user of VNF 130. If the different charge rate is lower than a second threshold preconfigured by the user of the VNF 130, the VML 110-2 may scale out the VNF 130 by allocating more resources to the VNF 130 to seek for better performance. Alternatively, or in addition, if the different charge rate exceeds a third threshold which is greater than the first threshold, the VML 110-2 may even terminate the VNF 130. For example, in case that a same limited resource is required by different VNFs 130, the VML 110-2 may allocate the limited resource to one VNF with a higher priority. Alternatively, or in addition, the VML 110-2 may scale in or even terminate another VNF 130 with a lower priority.

Figure 2:
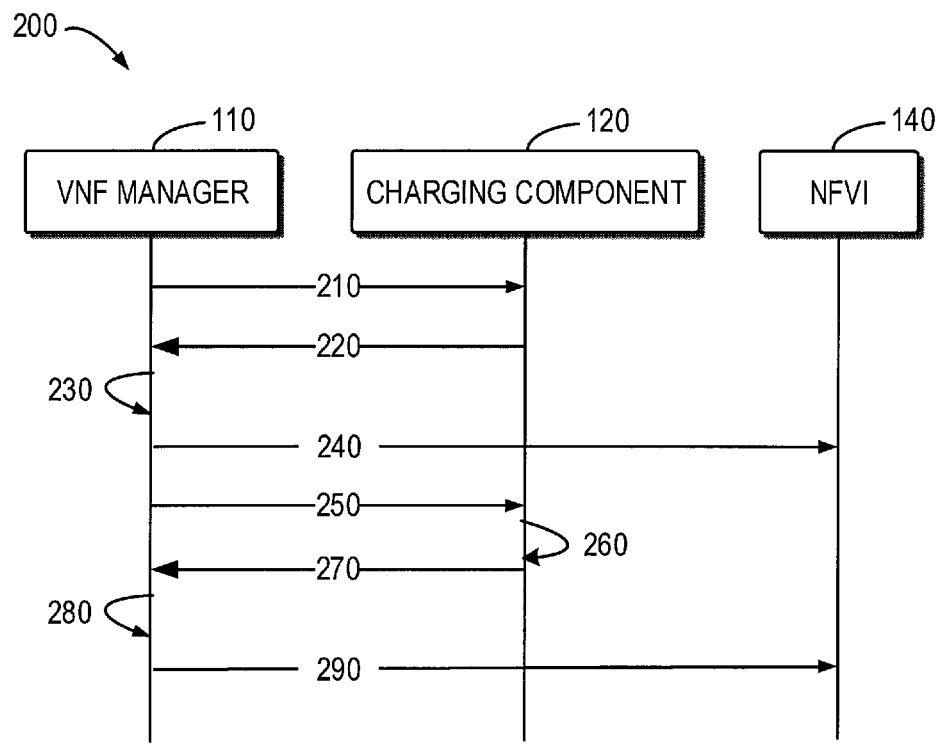
FIG. 2 shows a schematic diagram of an example process for managing a VNF in accordance with some embodiments of the present disclosure.

FIG. 2 shows a schematic diagram of an example process 200 for managing a VNF in accordance with some embodiments of the present disclosure. The process 200 may involve the VNF manager 110, the charging component 120 and the NFVI 140 as shown in FIG. 1. It is to be understood that process 200 may include additional acts not shown and/or omit some acts as shown. The scope of the present disclosure is not limited in this respect.

In response to receiving a first request to instantiate a first VNF 130-1, the VNF manager 110 sends 210 a second request for the charging information associated with the VNF 130-1. In some embodiments, the identity of the VNF 130-1 may be included in the second request as a mandatory information element.

Upon receipt of the second request from the VNF manager 110, the charging component 120 provides 220 the charging information for the first VNF 130-1 to the VNF manger 110. In some embodiments, the charging information may include a smart charging plan, which consists of a set of charging rules. Each of the charging rules may indicate a respective charge rate for charging the VNF 130-1 under a specific network condition. It enables the VNF 130-1 to be priced with a network condition-dependent charge rate.

In response to receiving the charging information from the charging component 120, the VNF manager 110 determines 230 a first charge rate for charging the VNF 130-1 under the current network condition. In some embodiments, the VNF manager 110 may further determine if the VNF 130-1 can be instantiated based on the charge rate. For example, if the charge rate is below a predetermined threshold, the VNF manager 110 may determine that the VNF 130-1 can be instantiated. Otherwise, the VNF manager 110 may determine that the VNF 130-1 cannot be instantiated.

In response to determine that the VNF 130-1 can be instantiated, the VNF manager 110 instantiates 240 the VNF 130-1 by operating the NFVI 140.

In some embodiments, the charging information received from the charging component 120 may indicate that the first charge rate for charging the VNF 130-1 can be changed based on a different network condition. In this event, in response to the VNF 130-1 being instantiated, the VNF manager 110 sends 250, to the charging component 120, a third request for a notification on a change in the charge rate for charging the VNF 130. In some embodiments, criteria for the notification can be determined and included in the third request by the VNF manager 110. For example, the criteria may configure a charging related event that should be reported from the charging component 120 to the VNF manager 110. The charging related event may be triggered by a change in the network condition associated with the VNF 130-1. Examples of the charging related event may include, but not limited to, low balance in an account of the user of the VNF 130-1, a change in the charging rule for the VNF 130-1 and so on.

Upon receipt of the third request, the charging component 120 may determine 260 whether the charging related event occurs. For example, the charging component 120 may determine whether the network condition associated with the VNF 130-1 has been changed. In response to determining that the network condition associated with the VNF 130-1 has been changed, the charging component 120 may send 270 a notification to the VNF manager 110. In some embodiments, the notification may indicate a different network condition associated with the VNF 130-1, which enables the VNF manager 110 to determine a different charge rate (also referred to as "second charge rate") for charging the VNF 130-1 by itself. Alternatively, or in addition, the notification may directly include the second charge rate to be applied to the VNF 130-1.

In response to receiving the notification from the charging component 120, the VNF manager 110 may determine 280 an appropriate operation to be performed on the VNF 130-1 based on the second charge rate. For example, if the second charge rate exceeds a first threshold preconfigured by the user of the VNF 130-1, a scale-in operation may be performed on the VNF 130-1 to satisfy requirements of the user of VNF 130-1. If the second charge rate is below a second threshold preconfigured by the user of the VNF 130, a scale-out operation may be performed on the VNF 130-1 to seek for better performance. The first threshold may be greater than the second threshold. Alternatively, or in addition, if the second charge rate exceeds a third threshold which is greater than the first threshold, the VNF 130-1 may be terminated.

The VNF manager 110 performs 290 the determined operation on the VNF 130-1 by operating the NFVI 140. The communication between the VNF manger 110 and the NFVI 140 may be similar to the traditional solution, and thus no further details will be provided herein.

Figure 3:
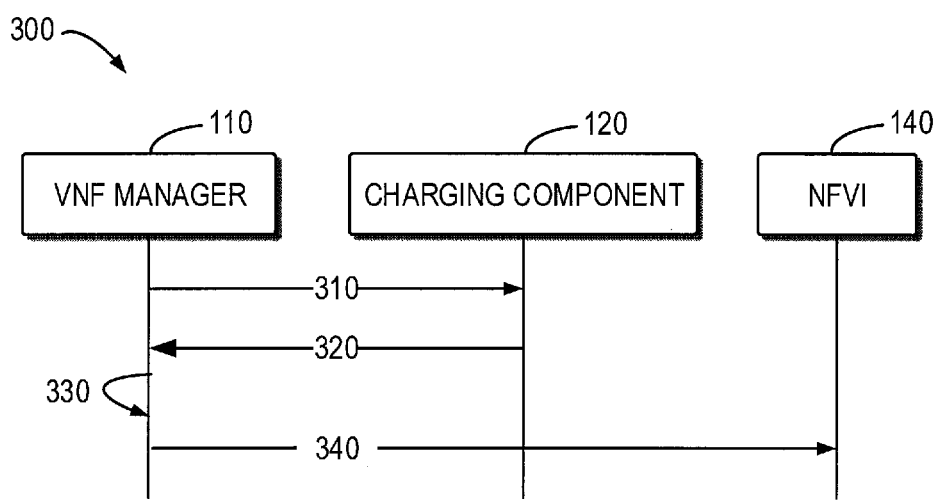
FIG. 3 shows a schematic diagram of an example process for managing a VNF in accordance with some embodiments of the present disclosure.

FIG. 3 shows a schematic diagram of an example process 300 for managing a VNF in accordance with some embodiments of the present disclosure. The process 300 may involve the VNF manager 110, the charging component 120 and the NFVI 140. It is to be understood that process 300 may include additional acts not shown and/or omit some acts as shown. The scope of the present disclosure is not limited in this respect.

In response to a second VNF 130-2 and a third VNF 130-3 requesting a same resource, the VNF manager 110 sends 310 a fourth request for the charging information associated with the VNFs 130-2 and 130-3. In some embodiments, the identities of the VNFs 130-2 and 130-3 may be included in the fourth request as a mandatory information element.

Upon receipt of the fourth request from the VNF manager 110, the charging component 120 provides 320 the charging information for the VNFs 130-2 and 130-3 to the VNF manger 110. In some embodiments, the charging information may indicate a priority (also referred to as "first priority") assigned to the VNF 130-2 and a priority (also referred to as "second priority") assigned to the VNF 130-3. The first and second priorities may be determined based on ROI of the VNFs 130-2 and 130-3 respectively. In some embodiments, the first priority is higher than the second priority, for example.

If it is determined that the first priority is higher than the second priority, the VNF manager 110 may determine 330 at least one operation to be performed on the VNFs 130-2 and 130-3. In some embodiments, the VNF manager 110 may determine that the resource will be allocated to the VNF 130-2, which have a higher priority than the VNF 130-3. Alternatively, or in addition, considering that the VNF 130-2 with a higher priority may fail since the resource it requires is in shortage, the VNF manager 110 may scale in or even terminate the VNF 130-3 with a lower priority.

The VNF manager 110 performs 340 the at least one determined operation on the VNFs 130-2 and 130-3 by operating the NFVI 140. The communication between the VNF manger 110 and the NFVI 140 may be similar to the traditional solution, and thus no further details will be provided herein.

Figure 4:
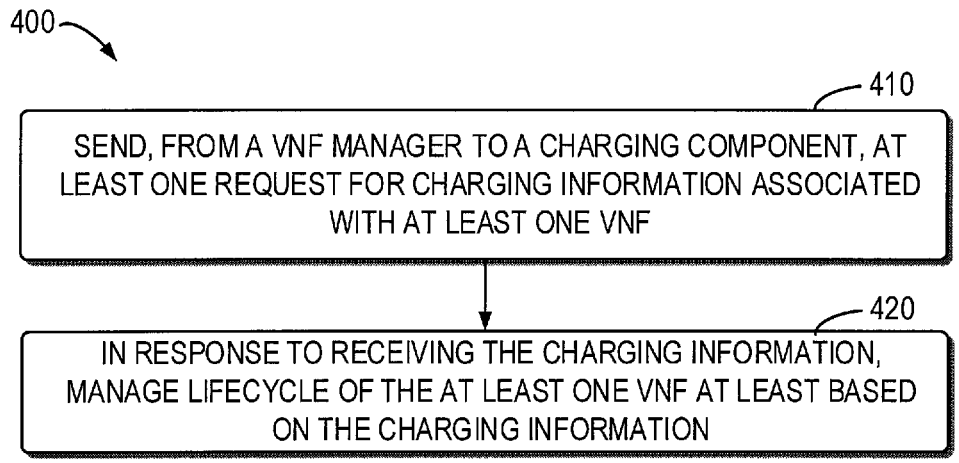
FIG. 4 shows a flowchart of an example method in accordance with some embodiments of the present disclosure.

FIG. 4 shows a flowchart of an example method 400 in accordance with some embodiments of the present disclosure. For example, the method 400 can be implemented at the VNF manager 110 as shown in FIG. 1. For the purpose of discussion, the method 400 will be described from the perspective of the VNF manager 110 with reference to FIG. 1. It is to be understood that the method 400 may include additional blocks not shown and/or may omit some blocks as shown, and the scope of the present disclosure is not limited in this regard.

At block 410, the VNF manager 110 sends, to the charging component 120, at least one request for charging information associated with the at least one VNF 130. The VNF manager 110 manages the at least one VNF 130. The charging information indicates respective rates for charging the at least one VNF 130 under different network conditions. At block 420, in response to receiving the charging information, the VNF manager 110 manages lifecycle of the at least one VNF 130 at least in part based on the charging information.

In some embodiments, the charging information may further indicate at least one priority assigned to the at least one VNF 130. The at least one priority may be associated with Return on Investment (ROI) of the at least one VNF 130.

In some embodiments, the at least one VNF 130 may include a first VNF. The VNF manager 110 may send the at least one request by sending, in response to receiving a first request to instantiate the first VNF, a second request for the charging information. The charging information may indicate a first charge rate for charging the first VNF. The VNF manager 110 may manage the lifecycle of the at least one VNF by instantiating the first VNF in response to the first charge rate being below a predetermined threshold.

In some embodiments, the charging information may indicate that the first charge rate for charging the first VNF can be changed based on a different network condition. In response to the first VNF being instantiated, the VNF manager 110 may send a third request for a notification on a change in the first charge rate to the charging component 120. In response to receiving from the charging component 120 the notification indicating a second charging rate for charging the first VNF, the VNF manager 110 may perform a second operation on the first VNF based on the second charge rate. The second charge rate is different from the first charge rate.

In some embodiments, in response to the second charge rate exceeding the first threshold, the VNF manager 110 may perform the second operation on the first VNF by scaling in the first VNF by reducing resources allocated to the first VNF.

In some embodiments, in response to the second charge rate being below a second threshold, the VNF manager 110 may perform the second operation on the first VNF by scaling out the first VNF by allocating more resources to the first VNF.

In some embodiments, in response to the second charge rate exceeding a third threshold, the VNF manager 110 may perform the second operation on the first VNF by terminating the first VNF.

In some embodiments, the at least one VNF may include second and third VNFs. The VNF manager 110 may send the at least one request by sending, in response to both of the second and third VNFs requesting a same resource, a fourth request for the charging information. The charging information may indicate a first priority assigned to the second VNF and a third priority assigned to the third VNF. The VNF manager may manage the lifecycle of the at least one VNF by performing, in response to the first priority being higher than the second priority, at least one of the following operations: allocating the resource to the second VNF, scaling in the third VNF, and terminating the third VNF.

Figure 5:
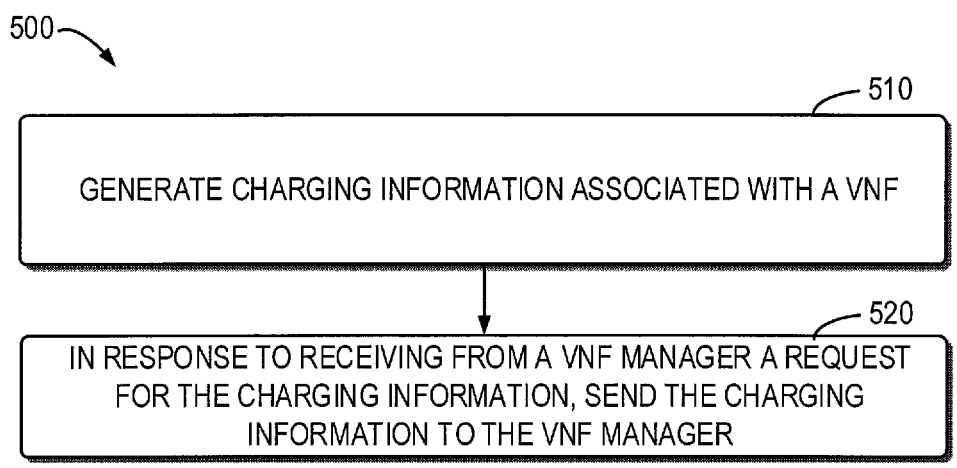
FIG. 5 shows a flowchart of an example method in accordance with some embodiments of the present disclosure.

FIG. 5 shows a flowchart of an example method 500 in accordance with some embodiments of the present disclosure. For example, the method 500 can be implemented at the charging component 120 as shown in FIG. 1. It is to be understood that the method 500 may include additional blocks not shown and/or may omit some blocks as shown, and the scope of the present disclosure is not limited in this regard.

At block 510, the charging component 120 generates charging information associated with the VNF 130. The charging information indicates a charge rate for charging the VNF 130 under a network condition. At block 520, in response to receiving from the VNF manager 110 a request for the charging information, the charging component 120 sends the charging information to the VNF manager 110. The VNF manager 110 manages lifecycle of the VNF 130 at least based on the charging information.

In some embodiments, the charging component 120 may generate the charging information by assigning, based on Return on Investment (ROI) of the VNF, a priority to the VNF 130. The charging information may be generated by the charging component 120 to indicate the priority assigned to the VNF 130.

In some embodiments, the charging information may further indicate that the charge rate for charging the VNF 130 can be changed based on a different network condition.

In some embodiments, in response to receiving another request for a notification on a change in the charge rate from the VNF manager 110, the charging component 120 may determine whether the network condition has been changed. In response to determining that the network condition has been changed, the charging component 120 may send the notification to the VNF manager 110. The notification may indicate another charge rate for charging the VNF 130.

Through the above depiction, it can be seen that embodiments of the present disclosure provide a new smart charging policy for NFV and enable dynamic VNF management based on smart charging information. Therefore, embodiments of the present disclosure can use less expensive resources for revenue generation and provide NFV providers with dynamic tariff to generate more revenues.

Figure 6:
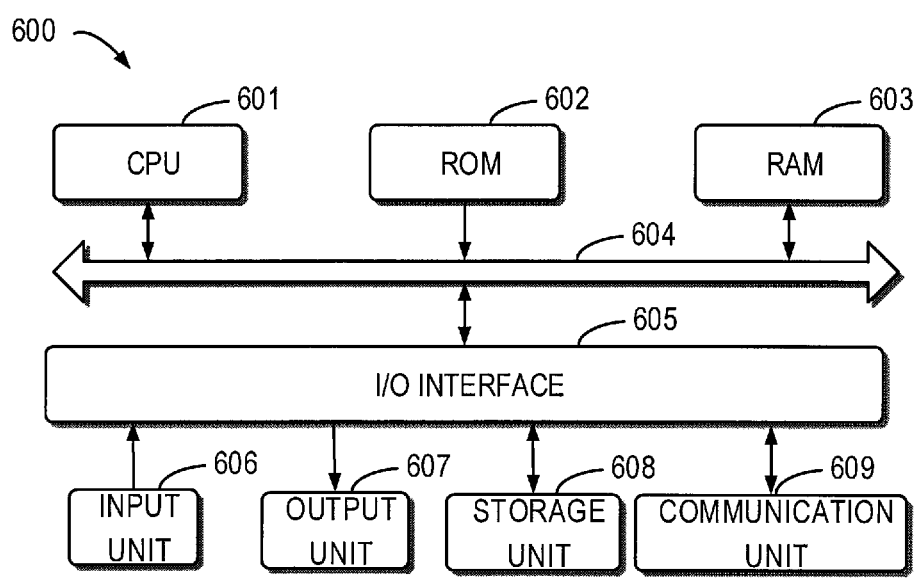
FIG. 6 is a simplified block diagram of a device that is suitable for implementing embodiments of the present disclosure.

FIG. 6 illustrates a schematic block diagram of a device 600 that can be used to implement the embodiments of the present disclosure. For example, the VNF manager 110 and/or the charging component 120 as shown in FIG. 1 can be implemented by the device 600. As shown in FIG. 6, the device 600 includes a central processing unit (CPU) 601 which may perform various appropriate actions and processing based on computer program instructions stored in the read only memory (ROM) 602 or computer program instructions uploaded from storage unit 608 to the random access memory (RAM) 603. In the RAM 603, there further stores various programs and data needed by operation of the device 600. The CPU 601, ROM 602 and RAM 603 are connected one another via a bus 604. The input/output (I/O) interface 605 is also connected to the bus 604.

The following components in the device 600 are connected to the I/O interface 605: including: an input unit 606, such as a keyboard, a mouse, and the like; an output unit 607, such as display of various types and loudspeakers; a storage unit 608, such as magnetic disk and optical disk; a communication unit 609, such as network card, modem, wireless communication transceiver. The communication unit 609 allows the device 600 to exchange data/information with other devices via computer networks, such as Internet and/or telecommunication networks.

The methods described above, such as the methods 400 and/or 500, can be executed by the processing unit 601. For example, in some implementations, the methods 400 and/or 500 can be implemented as a computer software program which is corporeally contained in a machine readable medium, such as the storage unit 608. In some implementations, the computer program can be partially or wholly loaded and/or mounted on the device 600 by the ROM 602 and/or the communication unit 609. When the computer program is uploaded to the RAM 603 and executed by the CPU 601, one or more steps of the methods 400 and/or 500 described above can be executed.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing a virtual network function, comprising:
sending, from a virtual network function manager to a charging component, at least one request for charging information associated with at least one virtual network function, the virtual network function manager managing the at least one virtual network function by implementing a logic function which provides a smart charging policy logic as a function that generates a virtual network function management policy based on the charging information received from the charging component, the charging information indicating respective rates for charging the at least one virtual network function under different network conditions; and
in response to receiving the charging information, managing lifecycle of the at least one virtual network function at least in part based on the charging information.

2. The method of claim 1, wherein the charging information further indicates at least one priority assigned to the at least one virtual network function, the at least one priority being associated with return on investment of the at least one virtual network function.

3. The method of claim 1, wherein
the at least one virtual network function includes a first virtual network function, and
the sending of the at least one request comprises: in response to receiving a first request to instantiate the first virtual network function, sending a second request for the charging information at least indicating a first charge rate for charging the first virtual network function; and
the managing of the lifecycle of the at least one virtual network function comprises: in response to the first charge rate being below a predetermined threshold, instantiating the first virtual network function.

4. The method of claim 3, wherein the charging information indicates that the first charge rate for charging the first virtual network function can be changed based on a different network condition, and the method further comprises:
in response to the first virtual network function being instantiated, sending to the charging component a third request for a notification on a change in the first charge rate; and
in response to receiving from the charging component the notification indicating a second charge rate for charging the first virtual network function, performing a second operation on the first virtual network function based on the second charge rate, the second charge rate being different from the first charge rate.

5. The method of claim 4, wherein performing the second operation on the first virtual network function comprises:
in response to the second charge rate exceeding the first threshold, scaling in the first virtual network function by reducing resources allocated to the first virtual network function.

6. The method of claim 2, wherein the at least one virtual network function includes second and third virtual network functions, and sending the at least one request comprises:
in response to the second and third virtual network functions requesting a same resource, sending a fourth request for the charging information, the charging information indicating a first priority assigned to the second virtual network function and a second priority assigned to the third virtual network function; and
the managing of the lifecycle of the at least one virtual network function comprises:
in response to the first priority being higher than the second priority, performing at least one of the following operations:
allocating the resource to the second virtual network function,
scaling in the third virtual network function, or
terminating the third virtual network function.

7. A method of managing a virtual network function, comprising:
generating charging information associated with the virtual network function, the charging information indicating a charge rate for charging the virtual network function under a network condition;
in response to receiving from a virtual network function manager a request for the charging information, sending the charging information to the virtual network function manager, the virtual network function manager being configured to manage lifecycle of the virtual network function by implementing a logic function that provides a smart charging policy logic as a function that generates a virtual network function management policy based at least based on the charging information.

8. The method of claim 7, wherein generating the charging information comprises:
assigning, based on return on investment of the virtual network function, a priority to the virtual network function; and
generating the charging information to indicate the priority assigned to the virtual network function.

9. An apparatus for managing a virtual network function, the apparatus comprising:
at least one processor; and
at least one non-transitory memory coupled to the processor and storing instructions thereon, the instructions, when executed by the processor, causing the apparatus to perform actions, the actions comprising:
sending, to a charging component, at least one request for charging information associated with at least one virtual network function, a virtual network function manager managing the at least one virtual network function by implementing a logic function which provides a smart charging policy logic as a function that generates a virtual network function management policy based on the charging information received from the charging component, the charging information indicating respective rates for charging the at least one virtual network function under different network conditions; and in response to receiving the charging information, managing lifecycle of the at least one virtual network function at least in part based on the charging information.

10. The apparatus of claim 9, wherein the charging information further indicates at least one priority assigned to the at least one virtual network function, the at least one priority being associated with return on investment of the at least one virtual network function.

11. The apparatus of claim 9, wherein
the at least one virtual network function includes a first virtual network function,
the sending of the at least one request comprises:
in response to receiving a first request to instantiate the first virtual network function, sending a second request for the charging information at least indicating a first charge rate for charging the first virtual network function; and
the managing of the lifecycle of the at least one virtual network function comprises:
in response to the first charge rate being below a predetermined threshold, instantiating the first virtual network function.

12. The apparatus of claim 11, wherein the charging information indicates that the first charge rate for charging the first virtual network function can be changed based on a different network condition, and the method further comprises:
in response to the first virtual network function being instantiated, sending, to the charging component, a third request for a notification on a change in the first charge rate; and
in response to receiving from the charging component the notification indicating a second charge rate for charging the first virtual network function, performing a second operation on the first virtual network function based on the second charge rate, the second charge rate being different from the first charge rate.

13. The apparatus of claim 10, wherein the at least one virtual network function includes second and third virtual network functions, and sending the at least one request comprises:
in response to the second and third virtual network functions requesting a same resource, sending a fourth request for the charging information, the charging information indicating a first priority assigned to the second virtual network function and a second priority assigned to the third virtual network function; and
the managing of the lifecycle of the at least one virtual network function comprises:
in response to the first priority being higher than the second priority, performing at least one of the following operations:
allocating the resource to the second virtual network function,
scaling in the third virtual network function, or
terminating the third virtual network function.

14. An apparatus for managing a virtual network function, comprising:
at least one processor; and
at least one non-transitory memory coupled to the processor and storing instructions thereon, the instructions, when executed by the processor, causing the apparatus to perform actions, the actions comprising:
generating charging information associated with the virtual network function, the charging information indicating a charge rate for charging the virtual network function under a network condition; and
in response to receiving from a virtual network function manager a request for the charging information, sending the charging information to the virtual network function manager, the virtual network function manager managing lifecycle of the virtual network function by implementing a logic function that provides a smart charging policy logic as a function that generates a virtual network function management policy based at least based on the charging information.

15. The apparatus of claim 14, wherein generating the charging information comprises:
assigning, based on return on investment of the virtual network function, a priority to the virtual network function; and
generating the charging information to indicate the priority assigned to the virtual network function.

16. A computer readable medium having instructions stored thereon, the instructions, when executed on at least one processor, causing the at least one processor to carry out the method according to claim 1.

17. A computer readable medium having instructions stored thereon, the instructions, when executed on at least one processor, causing the at least one processor to carry out the method according to claim 7.

* * * * *